(12) United States Patent
Kanekawa et al.

(10) Patent No.: US 10,374,531 B2
(45) Date of Patent: Aug. 6, 2019

(54) MOTOR CONTROL DEVICE AND ELECTRIC POWER STEERING SYSTEM USING SAID MOTOR DRIVE CIRCUIT

(71) Applicant: Hitachi Automotive Systems, Ltd., Hitachinaka-shi, Ibaraki (JP)

(72) Inventors: Nobuyasu Kanekawa, Tokyo (JP); Ryoichi Kobayashi, Hitachinaka (JP); Tomonobu Koseki, Hitachinaka (JP); Takuro Kanazawa, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/317,289

(22) PCT Filed: May 11, 2015

(86) PCT No.: PCT/JP2015/063410
§ 371 (c)(1),
(2) Date: Dec. 8, 2016

(87) PCT Pub. No.: WO2016/002340
PCT Pub. Date: Jan. 7, 2016

(65) Prior Publication Data
US 2017/0117830 A1    Apr. 27, 2017

(30) Foreign Application Priority Data

Jun. 30, 2014 (JP) .................. 2014-133499

(51) Int. Cl.
*H02P 27/08* (2006.01)
*H02P 6/10* (2006.01)
(Continued)

(52) U.S. Cl.
CPC ............... *H02P 6/10* (2013.01); *B62D 5/046* (2013.01); *H02P 21/22* (2016.02); *H02P 21/50* (2016.02);
(Continued)

(58) Field of Classification Search
CPC . G05B 11/28; H02P 7/29; H02P 6/085; H02P 27/08; H02P 27/06
(Continued)

(56) References Cited

U.S. PATENT DOCUMENTS 5,657,217 A * 8/1997 Watanabe ............... H02M 7/49
363/71
6,242,884 B1 * 6/2001 Lipo ....................... H02P 3/18
318/496
(Continued)

FOREIGN PATENT DOCUMENTS

EP    2 061 145 A1    5/2009
JP    60-128852 A     7/1985
(Continued)

OTHER PUBLICATIONS

International Search Report (PCT/ISA/210) issued in PCT Application No. PCT/JP2015/063410 dated Aug. 11, 2015 with English translation (Three (3) pages).
(Continued)

*Primary Examiner* — Rina I Duda
(74) *Attorney, Agent, or Firm* — Crowell & Moring LLP (57) ABSTRACT

The purpose of the present invention is not only to reduce ripple current but also to improve operation efficiency by reducing heat generation. When n is defined as an integer of 2 or more, a motor control device of the present invention drives n sets of windings by n sets of inverters. The motor control device is characterized in that when said n sets of inverters output high power, at least one or more of said n
(Continued)

sets of inverters are set to have an output duty cycle of 100%.

11 Claims, 11 Drawing Sheets

(51) Int. Cl.
    *H02P 21/00*     (2016.01)
    *H02P 29/60*     (2016.01)
    *B62D 5/04*     (2006.01)
    *H02P 25/22*     (2006.01)
    *H02P 21/22*     (2016.01)

(52) U.S. Cl.
    CPC .............. *H02P 25/22* (2013.01); *H02P 27/08* (2013.01); *H02P 27/085* (2013.01); *H02P 29/60* (2016.02); *B62D 5/04* (2013.01)

(58) Field of Classification Search
    USPC .................... 318/599, 811, 800, 801, 798
    See application file for complete search history.

(56) References Cited

U.S. PATENT DOCUMENTS

| | | | |
|---|---|---|---|
| 7,227,273 B2* | 6/2007 | Ahmad ................... | B60K 6/46 290/40 C |
| 8,084,972 B2* | 12/2011 | Strong ..................... | H02P 6/14 318/400.01 |
| 8,669,731 B2* | 3/2014 | Uryu ..................... | B62D 5/0484 318/460 |
| 2007/0236186 A1* | 10/2007 | Patterson ................ | F02N 11/04 322/59 |
| 2009/0134828 A1* | 5/2009 | Chakrabarti ............ | H02P 27/08 318/440 |
| 2010/0222968 A1* | 9/2010 | Kifuku ................. | B62D 5/0493 701/42 |
| 2011/0315470 A1* | 12/2011 | Uryu .................... | B62D 5/0484 180/446 |
| 2012/0049782 A1 | 3/2012 | Suzuki | |
| 2012/0194109 A1 | 8/2012 | Uryu et al. | |
| 2013/0207586 A1* | 8/2013 | Hayashi ................ | H02P 25/22 318/490 |
| 2014/0062375 A1 | 3/2014 | Suzuki | |
| 2015/0298727 A1 | 10/2015 | Kimpara et al. | |

FOREIGN PATENT DOCUMENTS

| | | |
|---|---|---|
| JP | 2009-100587 | 5/2009 |
| JP | 2010-161846 A | 7/2010 |
| JP | 2012-161154 A | 8/2012 |
| JP | 2014-50150 A | 3/2014 |
| WO | WO 2013/105225 A1 | 7/2013 |

OTHER PUBLICATIONS

Extended European Search Report issued in counterpart European Patent Application No. 15815400.5 dated Jan. 31, 2018 (Ten (10) pages).

Cho et al., "Optimal Design of Heatsink for 3 Phase Voltage Source Inverter System by Using Average Method," Modern Applied Science, Jan. 16, 2010, pp. 114-125, XP055441979.

\* cited by examiner

MOTOR CONTROL DEVICE AND ELECTRIC POWER STEERING SYSTEM USING SAID MOTOR DRIVE CIRCUIT

TECHNICAL FIELD

The present invention relates to a motor control device that uses a semiconductor switching element to convert electric power supplied from a power source.

BACKGROUND ART

Progress of automated control requires higher safety and reliability of electronic control devices. In the event of an abnormality, immediate detection of the abnormality is required to stop operation in order to secure safety of electronic control devices.

In addition, it is required not only to reliably stop operation in the event of failure for safety, but also to continue the operation after safety is secured. For example, since an electric power steering system has been used in a large-size vehicle with larger weight as improved in performance, stopping its operation in the event of failure causes large steering force to be manually generated. Thus, the operation needs to be continued even in the event of failure after safety is secured.

As a technique for continuing operation of an electric power steering system even in the event of failure, for example, PTL 1 (JP 2012-161154 A) discloses a technique for allowing a motor to include a pair of coils so that the pair of coils is driven by a pair of inverters. PTL 1 also discloses a technique for reducing ripple current by applying an offset to a duty cycle of PWM modulation of the pair of inverters, as well as for reducing imbalance of heat loss by changing the offset depending on a steering state.

CITATION LIST

Patent Literature

PTL 1: JP 2012-161154 A

SUMMARY OF INVENTION

Technical Problem

The techniques disclosed in PTL 1 above need a pair of inverters to enable operation to continue in the event of failure, and may cause a cost increase. Thus, it is further desirable that an advantage surpassing the cost increase be enjoyed even in normal time without failure. PTL 1 above discloses the technique for reducing ripple current by applying an offset to a duty cycle of PWM modulation of the pair of inverters. The present invention has been made in light of the above-mentioned problem, and an object thereof is not only to reduce ripple current, but also to improve operation efficiency by reducing heat generation.

Solution to Problem

To solve the problem described above, the present invention is a motor control device in which a set of n coils is driven by a set of n inverters, where n is defined as an integer of 2 or more, and at least one inverter in the set of n inverters has an output duty cycle of 100% when output of the set of n inverters is high.

Advantageous Effects of Invention

As described above, the present invention can reduce switching loss of an inverter that drives a motor and improve efficiency.

DESCRIPTION OF EMBODIMENTS

Before description of the present invention based on an example, a principle of the present invention will be described.

When a motor is driven by a plurality of (n) inverters, a duty cycle equivalent to that when the motor is driven by a single inverter (hereinafter referred to as a total duty cycle Dall) is an average value of a duty cycle Di (i is an ID number of an inverter) of output of each of the inverters, or a value obtained by Expression 1 below, if rating of each of the inverters is the same.

$$Dall = \Sum_{i=1}^{n} Di/n \quad \text{(Expression 1)}$$

If an output duty cycle of one inverter is 100%, Dall is 100/n % or more. Thus, in the present method, an appropriate Dall can be acquired only in the case where a target total duty cycle Dall is 100/n % or more, even if an output duty cycle of one inverter is 100%.

In consideration of providing two inverters, an appropriate Dall can be acquired only in the case where target Dall is 50% or more, even if an output duty cycle of one inverter is 100%.

The method described above can reduce switching loss by setting a duty cycle of at least one of a pair of inverters to 100%. The switching loss mentioned here includes not only loss associated with turning on and off of a switching element, but also loss caused by a junction potential difference of a body diode in a period until the switching element is turned on for synchronous switching at the time when current is returned.

In addition, alternate switching between inverters each having a duty cycle of 100% can reduce imbalance of heat loss (ohmic loss $P = R_{on} \times I^2$, where P is heat generation, Ron is on-resistance of a switching element, and I is current).

Hereinafter, embodiments of the present invention will be described with reference to drawings.

First Embodiment

Figure 1:
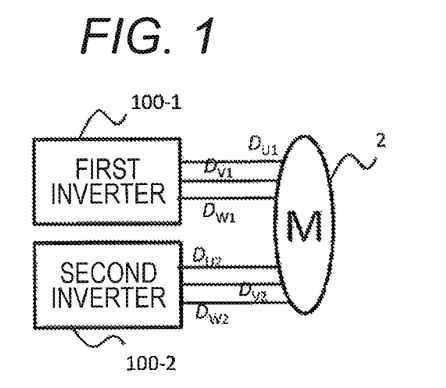
FIG. 1 is a block diagram of a motor-inverter system according to the present embodiment.

FIG. 1 is a block diagram of a motor-inverter system according to the present embodiment.

A motor 2 includes a pair of coils, and is driven by each of a first inverter 100-1 and a second inverter 100-2. While each of the coils of the motor 2 may be connected to form a Δ connection or a Y connection (star connection), the present embodiment can be applied to both of the Δ connection and the Y connection. In addition, while a case of including a pair of inverters is described in the present embodiment, the invention according to the present embodiment can be applied to even a motor control device including a pair of inverters or more.

That is, under a condition where n is defined as the number of inverters and in is defined, as an integer equal to or less the n, an output duty cycle of m inverters is set to 100% when a target value of a total duty cycle of output of a set of n inverters is m×100/n % or more.

In the present embodiment, the first inverter 100-1 applies Du1, Dv1, and Dw1 to a first coil of the motor 2. Likewise, the second inverter 100-2 applies a waveform of a duty cycle of each of Du2, Dv2, and Dw2 to a second coil, of the motor 2.

Figure 2:
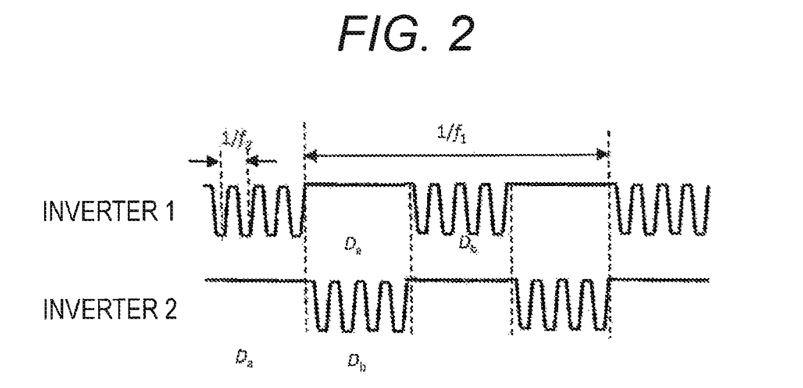
FIG. 2 is a waveform chart illustrating an example of a motor drive waveform when Dall is 50% or more.

FIG. 2 is a waveform chart of motor drive in the present embodiment.

As illustrated in FIG. 2, Du1, Dv1, and Dw1 formed by the first inverter 100-1 are switched to form a cycle of 1/f1 in the order from Da being a duty cycle of 100% to Db being a duty cycle of other than 100%. Likewise, Du2, Dv2, and Dw2 formed by the second inverter 100-2 are switched to form a cycle of 1/f1 in the order from Db to Da. In addition, a cycle of a PWM waveform is indicated as 1/f2.

In the example described above, since there is no switching operation in the duty cycle Da (=100%) no switching loss is generated and loss can be reduced accordingly. In addition, since the inverters are alternately driven at the duty cycle Da (=100%), heat generation can be prevented from concentrating at one of the inverters.

From a different viewpoint, it can be also thought that f1 is a switching frequency during Da (=100%), and f2 is a switching frequency during Db. Since f1 is less than f2, switching loss can be significantly reduced during Da (=100%) in which f1 is a switching frequency.

It is desirable that f2 be a frequency within an audible range or more than the audible range, and that a cycle 1/f1 be less than a thermal time constant of each of the first inverter 100-1 and the second inverter 100-2. Specifically, it is desirable that the cycle 1/f1 be less than a thermal time constant of the inverters.

Second Embodiment

Each of FIGS. 3, 5, 7, and 8 illustrates an example of a target total duty cycle Dall and an example of the duty cycles Da and Db to be assigned to each inverter.

Figure 3:
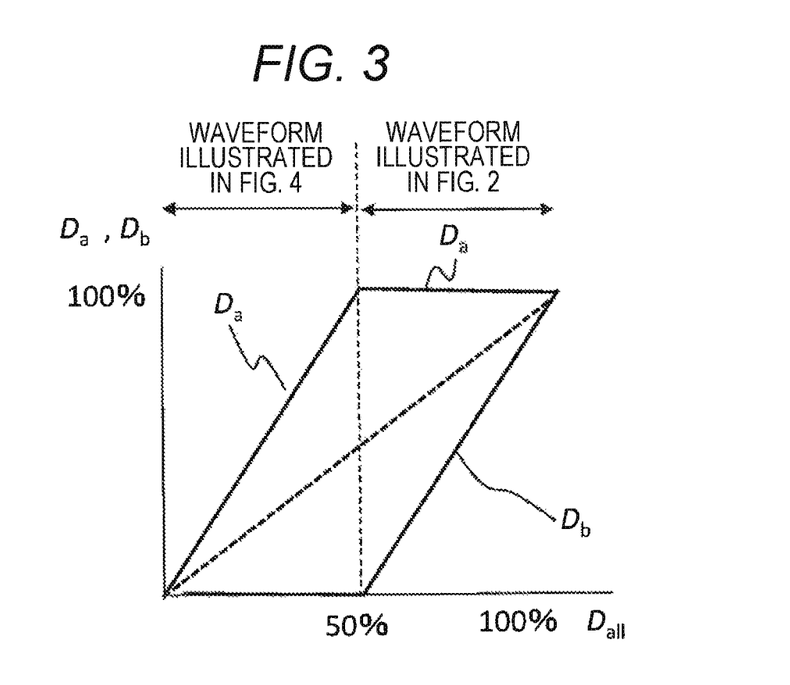
FIG. 3 is a map diagram is a state where Da is 2Dall and Db is 0 when Dall is less than 50%, and Da is 100% and Db is (2Dall–100)% when Dall is 50% or more.
Figure 4:
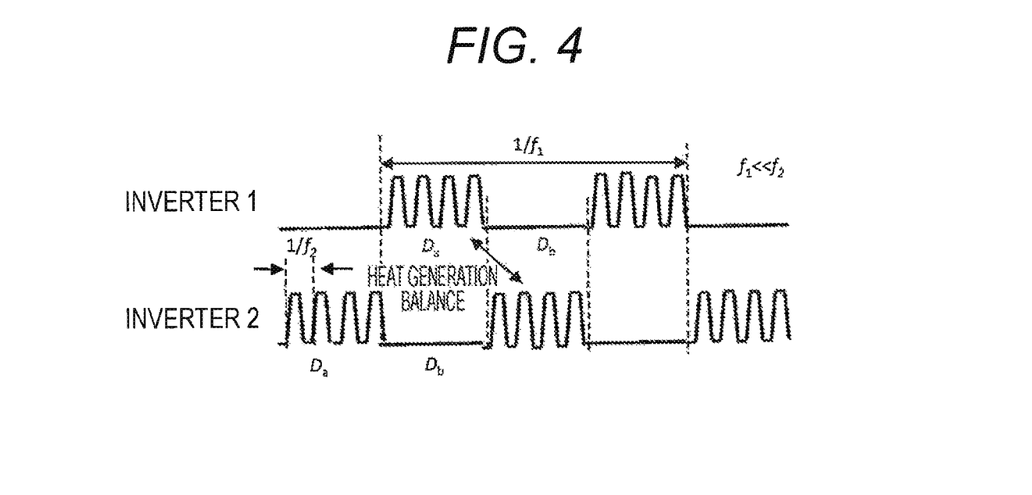
FIG. 4 is a waveform chart illustrating an example of a motor drive waveform when Dall is less than 50%.

FIG. 3 is a map diagram illustrating a state where Da is 2Dall and Db is 0 when Dall is less than 50%, and Da is 100% and Db is (2Dall−100)% when Dall is 50% or more. FIG. 4 is a waveform chart illustrating an example of a motor drive waveform when Dall is less than 50%. FIG. 2 is a waveform chart illustrating an example of a motor drive waveform when Dall is 50% or more.

Figure 5:
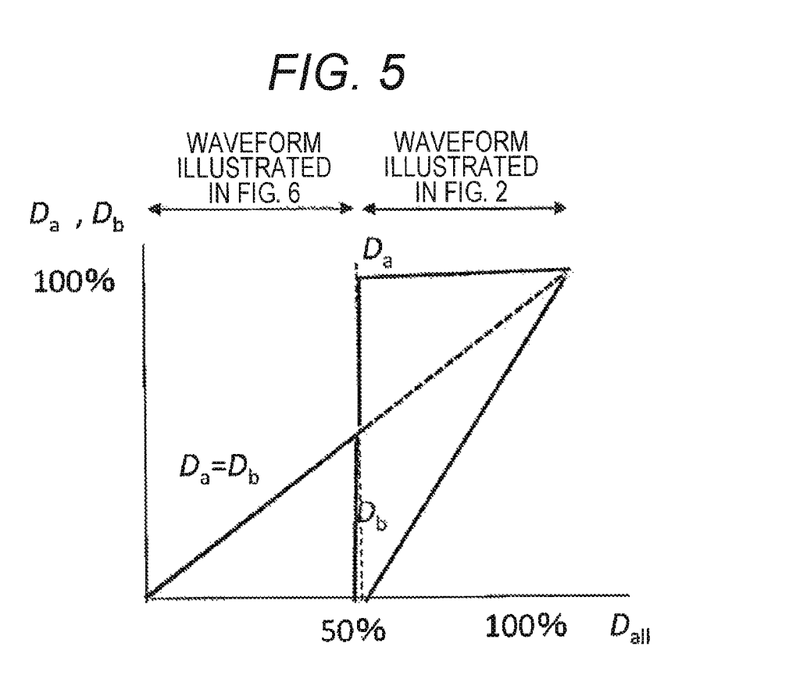
FIG. 5 is a map diagram illustrating a state where Da and Db each equal Dall when Dall is less than 50%, and Da is 100% and Db is (2Dall–100)% when Dall is 50% or more.
Figure 6:
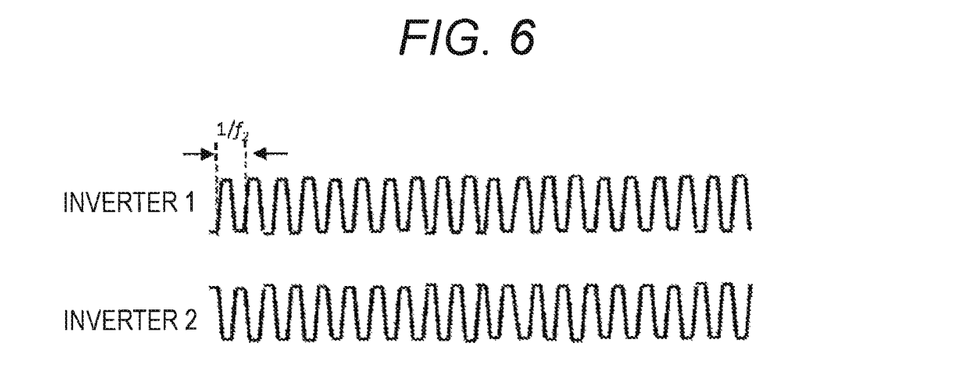
FIG. 6 is a waveform chart of motor drive by a pair of inverters.

FIG. 5 is a map diagram illustrating a state where Da and Db each equal Dall when Dall is less than 50%, and Da is 100% and Db is (2Dall−100)% when Dall is 50% or more. When Dall is less than 50%, as illustrated in FIG. 6, the first inverter 100-1 and the second inverter 100-2 each operate in the same duty cycle, and have a waveform with a reversed phase to reduce ripple current flowing into a power source and a capacitor connected to the power source. When Dall is 50% or more, a motor drive waveform illustrated in FIG. 2 is obtained as with the example of FIG. 3.

Figure 7:
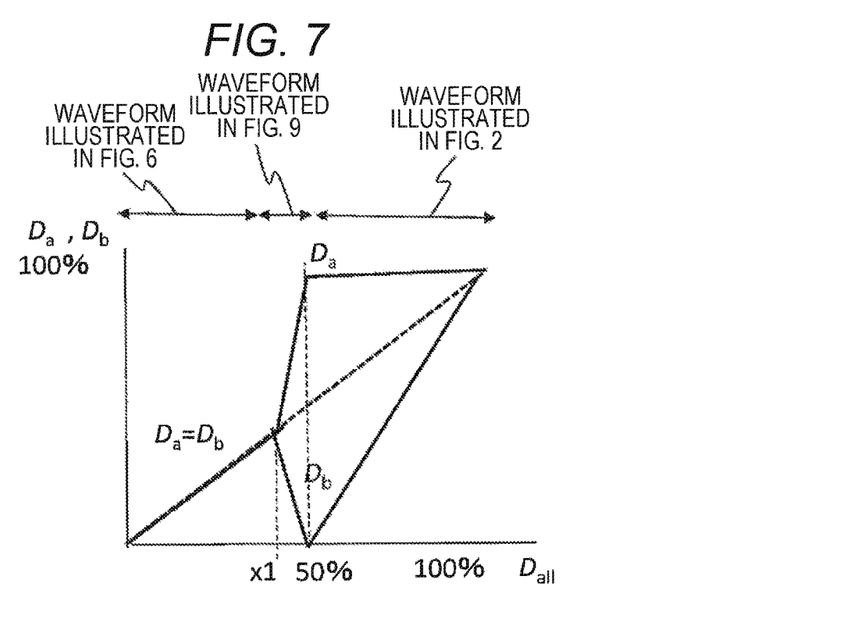
FIG. 7 is a map diagram illustrating an example in which sudden change of Da and Db is avoided in FIG. 5.
Figure 9:
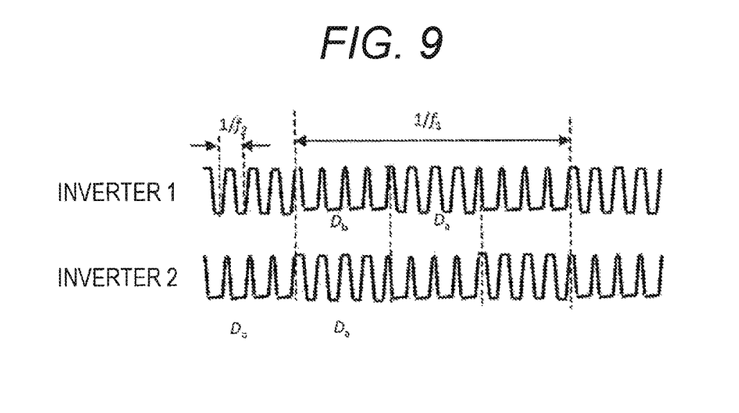
FIG. 9 is a waveform chart of motor drive by a pair of inverters.

FIG. 7 is a map diagram illustrating an example in which sudden change of Da and Db is avoided in FIG. 5. The example shows Da and Db that are gradually increased or reduced from Dall of x1 just before Dall becomes 50%, under a condition where Da and Db each equal Dall, so that Da becomes 100% and Db becomes 0% when Dall is 50%, and Da becomes 100% and Db becomes (2Dall−100)% when Dall is 50% or more. When Dall is in a range between x1 and 50%, a motor drive waveform has Da and Ph that are alternately switched as illustrated in FIG. 9.

If a control loop has conversion from Dall to Da and Db, or Da and Db have characteristics of causing sudden change, operation of a control system may become unstable due to an error in Dall, which may cause hunting or the like. The present example eliminates a possibility that operation of the control system becomes unstable, by avoiding sudden change of Da and Db. For example, Dall of x1 is 45% or the like.

Figure 8:
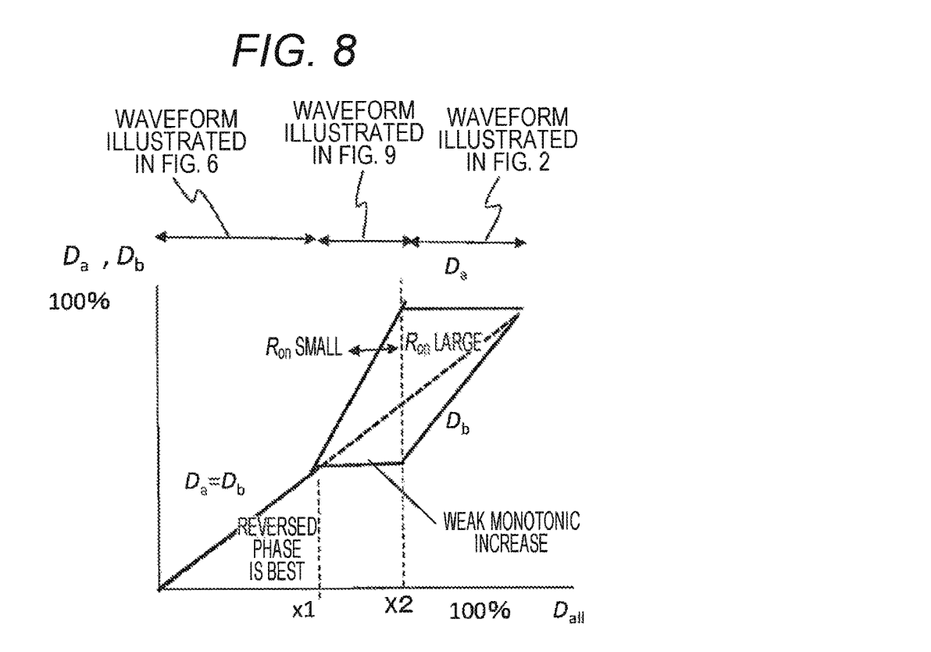
FIG. 8 is a map diagram illustrating an example in which weak monotonic increase ($\delta Da/\delta Dall$ is zero or more, and $\delta Db/\delta Dall$ is zero or more) is applied to Da and Db with respect to Dall.

FIG. 8 is a map diagram further illustrating an example in which weak monotonic increase (δDa/δDall is zero or more, and δDb/δDall is zero or more) is applied to Da and Db with respect to Dall. Da and Db each equal Dall in a region where Dall is less than x1. Db is x1 and Da is increased to (2Dall−x1) in a region where Dall is more than x1 but less than x2. Da is 100% and Db is (2Dall−100)% in a region where x2 is less than Dall.

Figure 17:
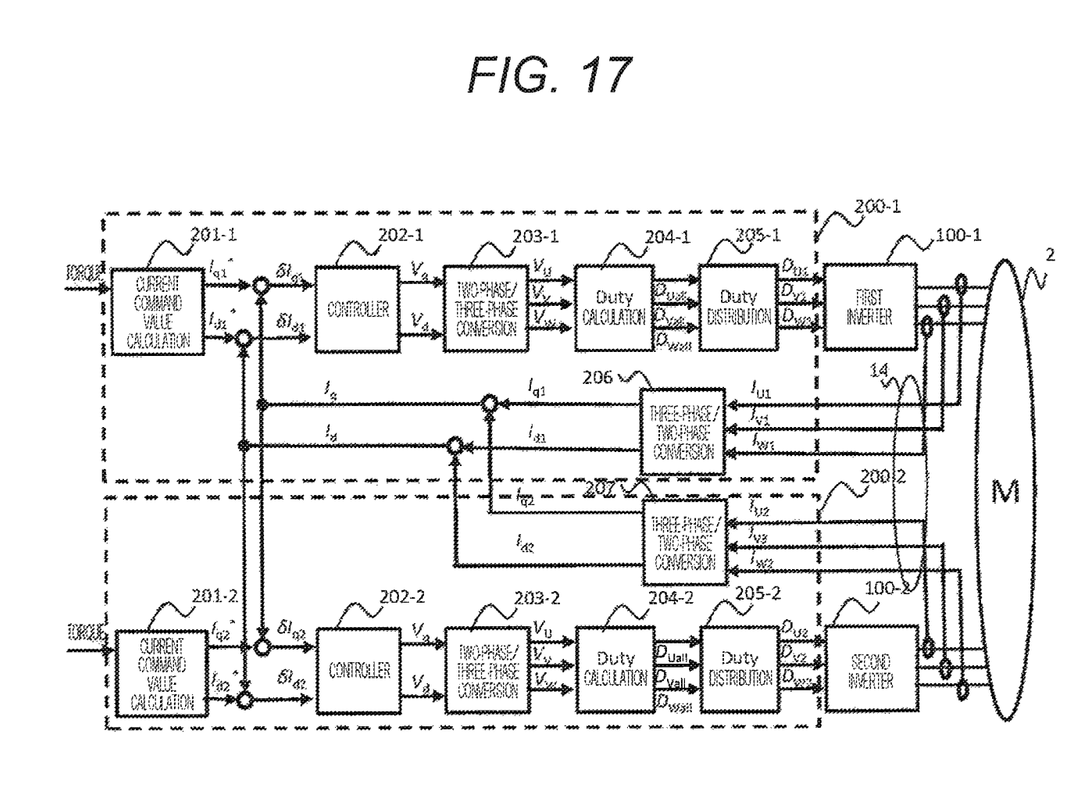
FIG. 17 is a first system block, diagram of a motor control device according to the present embodiment.
Figure 18:
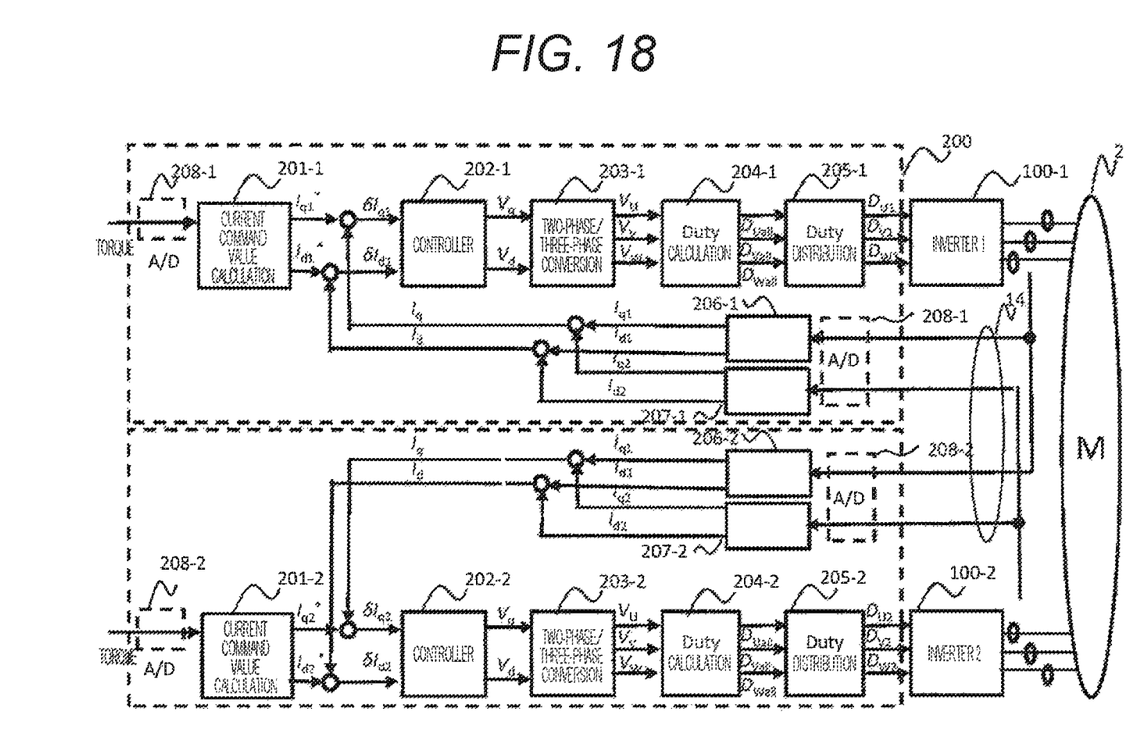
FIG. 18 is a second system block diagram of the motor control device according to the present embodiment.

FIG. 17 is a first system block diagram of a motor control device according to the present embodiment. FIG. 18 is a second system block diagram of the motor control device accord rig to the present embodiment.

In a system configuration including duplex (redundant) control devices 200-1 and 200-2, as illustrated in FIGS. 17 and 18, to avoid influence of failure in the control device 200-1 or 200-2, a conversion error in A/D converters 208-1 and 208-2 illustrated in FIG. 18, or the like, may cause a difference between Dall target values of the control devices 200-1 and 200-2.

If the Dall target value includes an error as described above, control may be unstable in a case were conversion from Dall to Da and Db is not a monotonic increase, but has decrease as illustrated in FIG. 7. For example, if the error causes the Dall target value to be less than X1 in one of the control devices 200-1 and 200-2 that outputs Da, and causes the Dall target value to be X1 or more in the other thereof that outputs Db, a gradient of Da becomes 1, a gradient of Db becomes extremely negative, and a gradient of (Da+Db) becomes negative. Thus, a control gain that is essentially positive may become negative to deteriorate stability of the control system.

Then, as shown in the present example, applying weak monotonic increase to Da and Db with respect to Dall enables control operation to be stably performed even in the system configuration including the duplex (redundant) control devices 200-1 and 200-2, as illustrated in FIGS. 17 and 18, to avoid influence of failure in the control device 200-1 or 200-2. From a viewpoint of continuous control, it is desirable to apply strict monotonic increase ($\delta Da/\delta Dall$ is more than 0, and $\delta Db/\delta Dall$ is More than 0) to Da and Db with respect to Dall. However, from a viewpoint of stability of control, applying weak monotonic increase is sufficient. That is, the weak monotonic increase allows duty cycles of output of a set of n inverters to be differentiable by a total duty cycle. The strict monotonic increase allows a first derivative of a total duty cycle of duty cycles of output of a set of n inverters to be zero or more.

Figure 10:
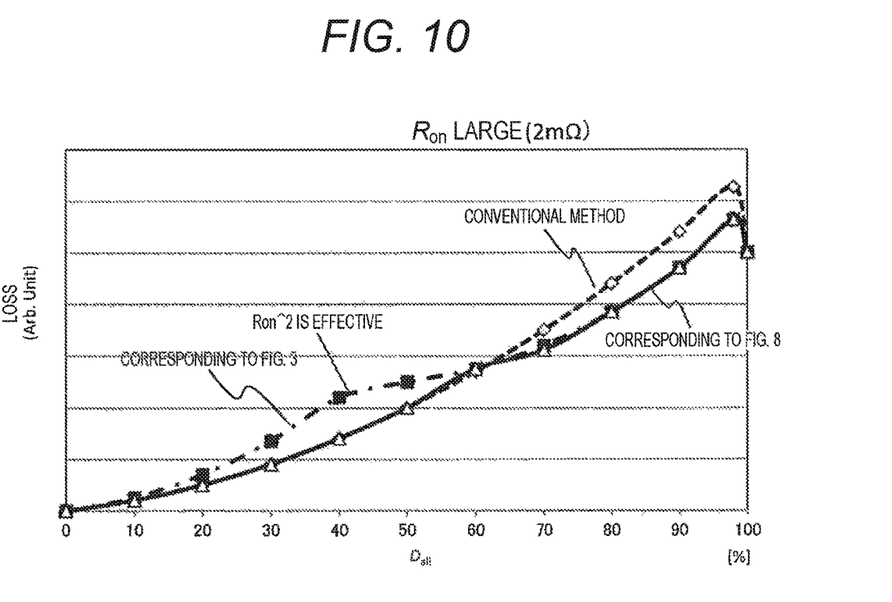
FIG. 10 is a graph of loss when on-resistance Ron of a MOSFET is large.

FIG. 10 is a graph of loss when on-resistance Ron of MOSFET is large. A dotted line corresponds to a conventional method without using the present embodiment, a dashed line corresponds to a control method illustrated in FIG. 3, and a solid line corresponds to a control method illustrated in FIG. 8.

In the control method illustrated in FIG. 3, it is found that ohmic loss ($i^2 Ron$) increases near Da of 100% and loss increases as compared to the conventional method in a region where Dall is less than 50%. In a region where Dall is more than 60%, it is found that loss is reduced more in the methods of FIGS. 3 and 8 than in the conventional method.

Figure 11:
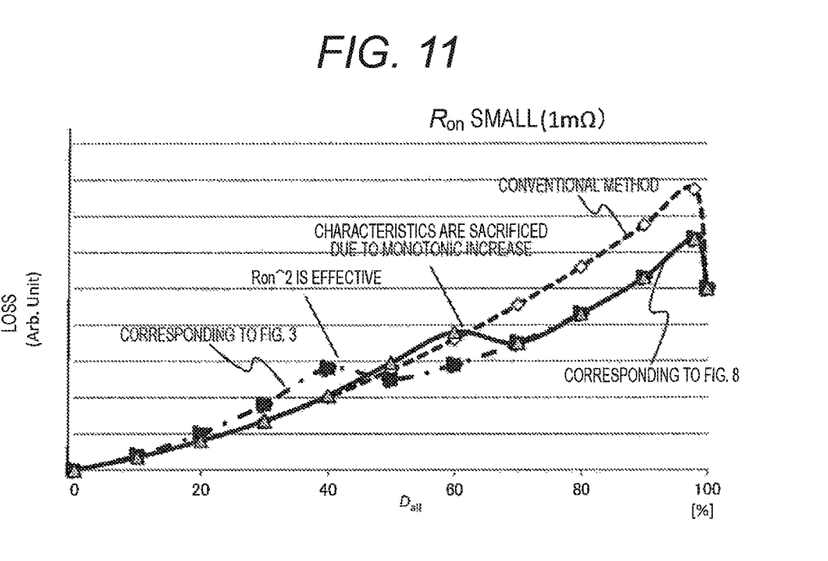
FIG. 11 is a graph of loss when on-resistance Ron of the MOSFET is small.
Figure 12:
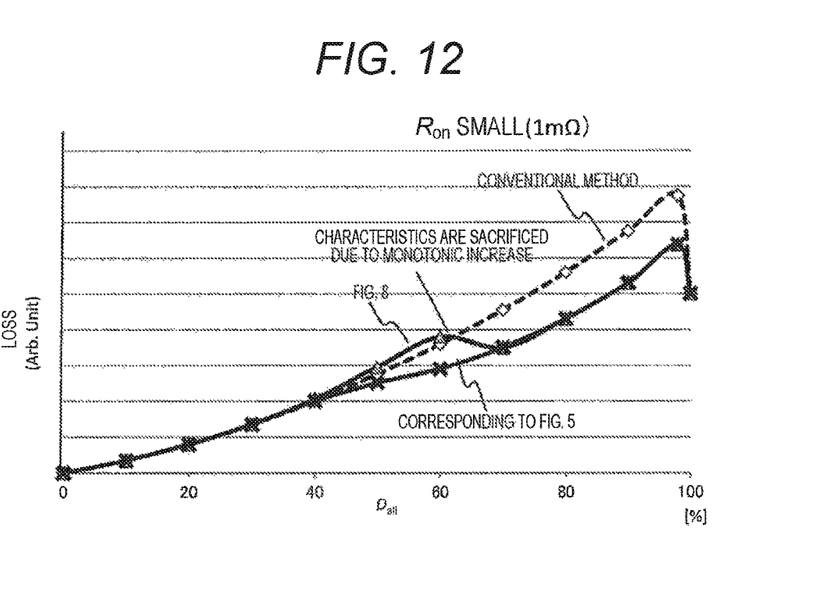
FIG. 12 is a graph of loss when on-resistance Ron of the MOSFET is small.

FIGS. 11 and 12 each are a graph of loss when on-resistance Ron of a MOSFET is small. In the control method illustrated in FIG. 3, it is found that ohmic loss ($i^2 Ron$) increases near Da of 100% and loss increases as compared to the conventional method in a region where Dall is less than 50%, as illustrated in FIG. 11. In a region where Dall is more than 60%, it is found that loss is reduced more in the methods of FIGS. 3 and 8 than in the conventional method, but that reduction effect of loss in FIG. 8 is inferior to the conventional method in a region near Dall of 60%. In this region, it is found that low loss characteristics are sacrificed due to the monotonic increase. As illustrated in FIG. 12, loss is reduced in the region where Dall is more than 60% by a method of FIG. 5.

Figure 13:
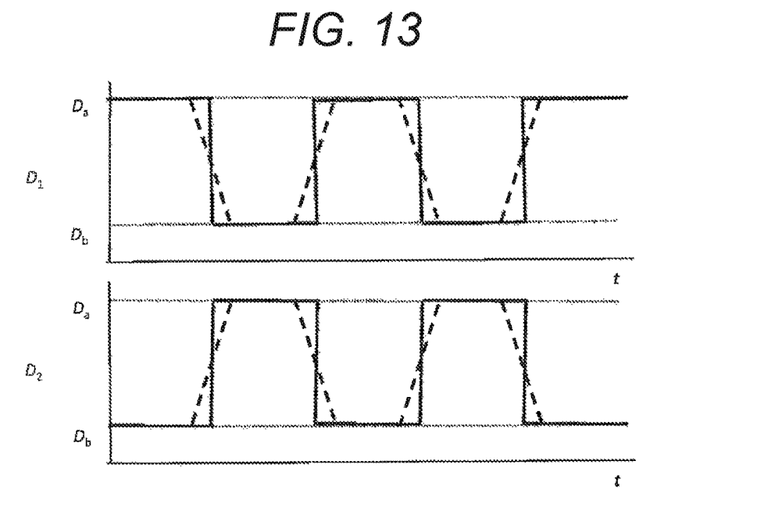
FIG. 13 illustrates change over time of respective duty cycles D1 and D2 of a first inverter 100-1 and a second inverter 100-2.

FIG. 13 illustrates change over time of respective duty cycles D1 and D2 of the first inverter 100-1 and the second inverter 100-2. Although a duty cycle can also be changed stepwise as illustrated by a solid line, a control level difference due to a control error or the like can be prevented from occurring by gradually changing the duty cycle as illustrated by a broken line.

Third Embodiment

Figure 14:
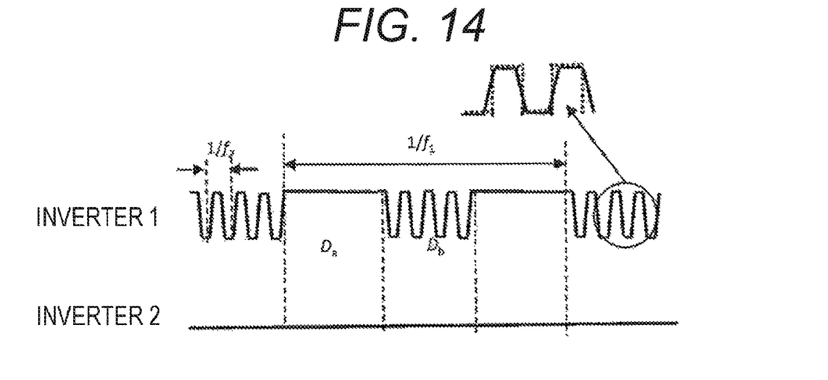
FIG. 14 is a waveform chart illustrating an example in which one of the first inverter 100-1 and the second inverter 100-2 fails, and only the other inverter drives a motor
Figure 15:
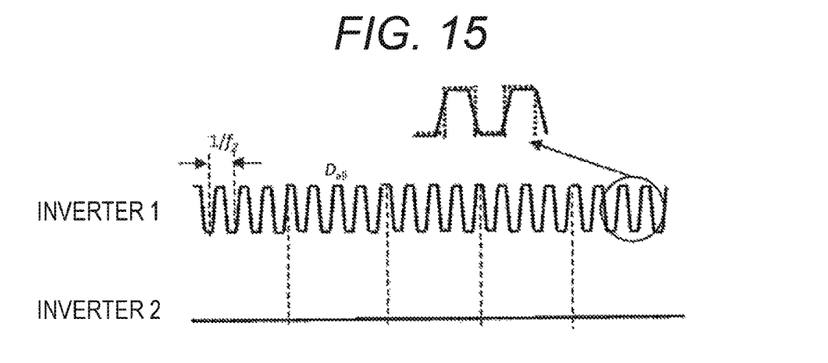
FIG. 15 is a waveform chart illustrating an example in which one of the first inverter 100-1 and the second inverter 100-2 fails, and only the other inverter drives the motor 2.

FIGS. 14 and 15 each are a waveform chart illustrating an example in which one of the first inverter 100-1 and the second inverter 100-2 fails, and only the other inverter (the first inverter 100-1 in the present embodiment) drives a motor 2.

The switching waveform has a moderate gradient as illustrated by a solid line during normal time to prevent electromagnetic noise from occurring, and has a steep gradient as illustrated by a broken line in the event of failure of the inverter to reduce switching loss. The gradient of a switching waveform can conventionally be achieved by capacitance of a gate circuit of a MOSFET in an output stage, and a time constant defined by driving force of a driving circuit. That is, the moderate gradient can be achieved by reducing driving force of a driving circuit during normal time, and the steep gradient can be achieved by increasing the driving force of the driving circuit in the event of failure of the inverter.

A driving duty cycle may be formed of Da and Db as illustrated in FIG. 14, or may be formed of Dall as illustrated in FIG. 15. In addition, the duty cycle may be formed of 2Dall (an upper limit is 100%) immediately after failure of an inverter, and may be gradually reduced to be formed of Dall. According to this method, a remaining inverter is temporarily driven by a doubled current immediately after the failure of the inverter in order to prevent total torque from being halved due to the failure of the inverter.

Fourth Embodiment

Figure 16:
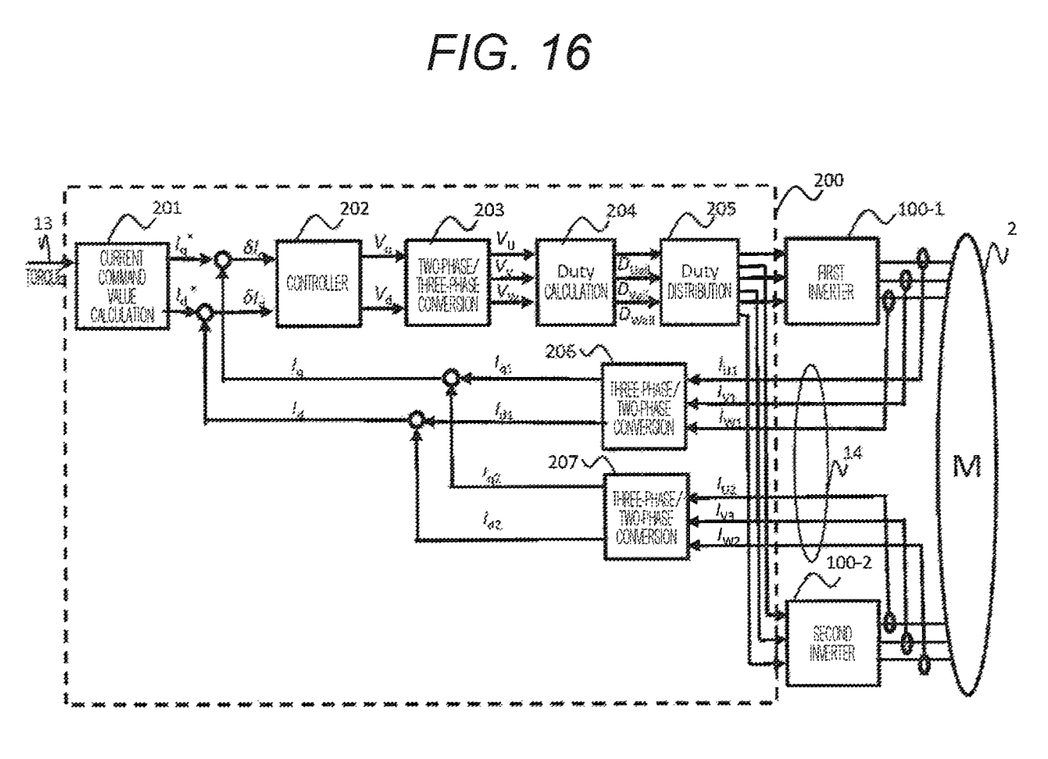
FIG. 16 is a block diagram illustrating an example of a control device 200 for achieving the present embodiment.

FIG. 16 is a block diagram illustrating an example of a control device 200 for achieving the present embodiment. Currents of each phase Iu1, Iv1, and Iw1, and Iu2, Iv2, and Iw2 of the first inverter 100-1 and the second inverter 100-2, are respectively converted into d-axis currents and q-axis currents Id1 and Iq1, and Id2 and Iq2 by three-phase/two-phase converters 205 and 206, and then combined to form a d-axis current Id and a q-axis current Iq. The d-axis current Id and the q-axis current Iq are subtracted from current command values Id* and Iq* calculated by a current command value calculator 201 to form error signals δId and δIq, respectively. Target voltages Vd and Vq are generated by a controller 202, and then a two-phase/three-phase converter 203 converts the target voltages Vd and Vq into voltage target values of each phase Vu, Vv, and Vw. Subsequently, a duty calculator 204 forms target duty cycles of each phase Duall, Dvall, and Dwall.

Subsequently, Duall, Dvall, and Dwall are converted into duty cycles Du1, Dv1, and Dw1, and duty cycles Du2, Dv2, and Dw2, distributed, to the first inverter 100-1 and the second inverter 100-2, respectively, for each phase, by a duty distributor 205 according to FIGS. 3, 5, 7, and 8. Accordingly, the first inverter 100-1 and the second inverter 100-2 are driven by a PWM.

FIGS. 17 and 18 each illustrate an example having redundant control devices 200-1 and 200-2. Particularly, FIG. 18 illustrates an example in which the three-phase/two-phase converters 205 and 206 also have redundant converters 205-1 and 205-2, and duplex converters 206-1 and 206-2, respectively. In addition, an A/D converter for converting a current value and a torque signal also has redundant converters 208-1 and 208-2.

According to the present example described above, since the redundant control devices 200-1 and 200-2 are provided, failure of the control device does not cause both of the first inverter 100-1 and the second inverter 100-2 to stop operating.

Fifth Embodiment

Figure 19:
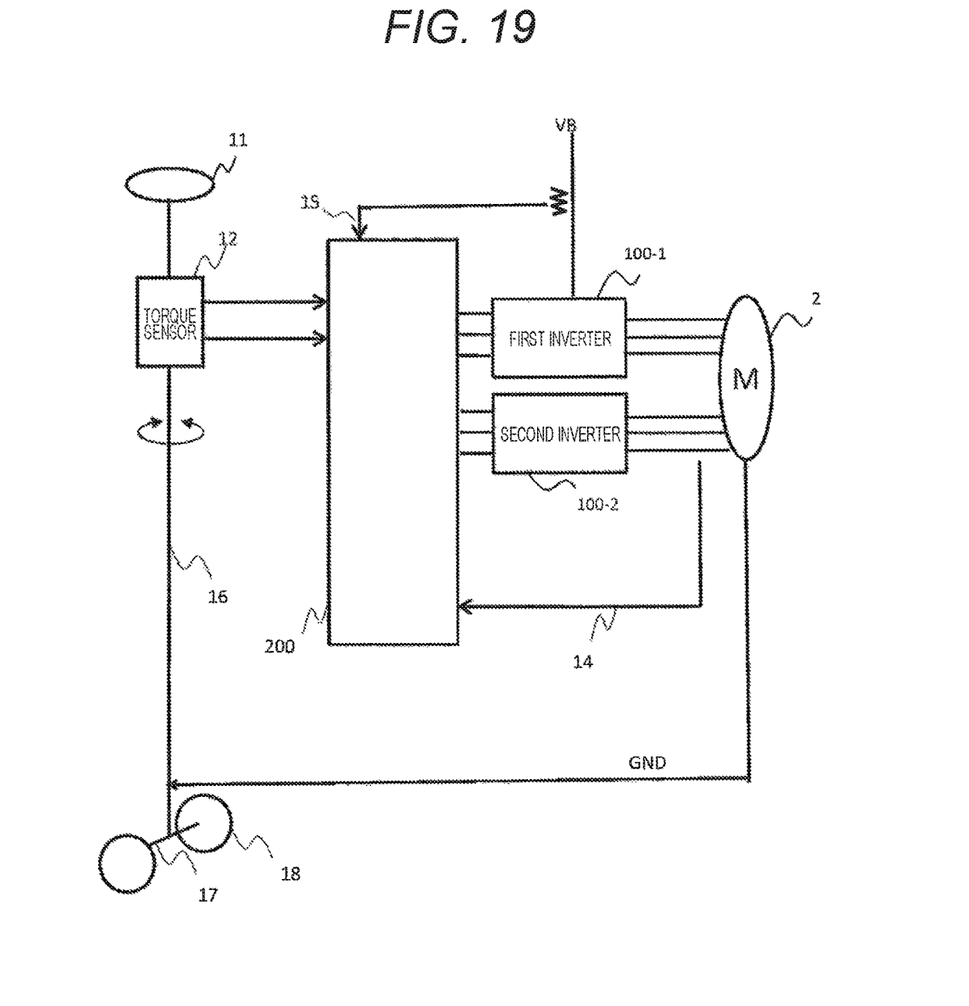
FIG. 19 is a block diagram of an electric power steering system according to the present embodiment.

FIG. 19 is a configuration diagram of an electric power steering system according to the present embodiment. The electric power steering system includes the first inverter 100-1 and the second inverter 100-2, and also includes a steering wheel 11, a rotation shaft 16 attached to the steering wheel 11, a torque sensor 12 attached to the rotation shaft 16, a steering mechanism 17, microprocessors 100-1 and 100-2, and a motor 8. A phase current detection signal 14 and a total current detection signal 15 are input to the control device 200.

The steering mechanism 17 controls a direction of wheels 18 steered by the rotation shaft 16. The steering mechanism 17 or the rotation shaft 16 has steering force assisted by the motor 2. The first inverter 100-1 and the second inverter 100-2 are controlled on the basis of output of the control device 200 to drive the motor 2.

Thus, in the electric power steering system according to the present example, a duty cycle of each of the first inverter 100-1 and the second inverter 100-2 is optimized to reduce heat loss.

REFERENCE SIGNS LIST 2 motor
11 steering wheel
12 torque sensor
14 phase current detection signal
15 total current detection signal 15
16 rotation shaft
17 steering mechanism
18 wheel
100-1 first inverter
100-2 second inverter
200 control device
Da duty cycle
Db duty cycle
Dall total duty cycle

The invention claimed is:

1. A motor control device for a motor, comprising:
a set of n coils driven by a set of n inverters, n being defined as an integer of 2 or more; and
two redundant control devices, each of the redundant control devices being configured to individually control the motor, such that upon failure of one of the two redundant control devices, the other of the two redundant control devices is configured to continue controlling the motor, wherein
at least one inverter in the set of n inverters has an output duty cycle of 100% when output of the set of n inverters is higher than a given value, the at least one inverter switching another inverter of the set of n inverters with a predetermined frequency, and
the motor device is configured to operate at a given cycle, the given cycle being 1/(the predetermined frequency), the given cycle is less than a thermal time constant of each of the at least one inverter and the another inverter.

2. The motor control device according to claim 1, further comprising three phase to two phase converters, each three phase to two phase converter being directly interposed between the motor and one of the set of n inverters.

3. The motor control device according to claim 2, wherein m is defined as an integer equal to or less than the n, an output duty cycle of m inverters is set to 100% when a target value of a total duty cycle of output of the set of n inverters is m×100/n % or more.

4. The motor control device according to claim 2, wherein the at least one inverter has the output duty cycle of 100% is switched with the predetermined frequency.

5. The motor control device according to claim 4, wherein the set of n inverters has an inverter having the output duty cycle set at 100%, the inverter being switched at the predetermined frequency.

6. The motor control device according to claim 3, wherein duty cycles of output of the set of n inverters are differentiable by the total duty cycle.

7. The motor control device according to claim 3, wherein a first derivative of the total duty cycle of the duty cycles of output of the set of n inverters is zero or more.

8. The motor control device according to claim 2, wherein when duty cycles of output of at least two inverters are less than 100%, switching timing of output of the at least two inverters has a phase difference.

9. The motor control device according to claim 2, further comprising a slope control function that controls a switching waveform of an output waveform to be a moderate gradient when all of the set of n inverters are normal, and controls the switching waveform of the output waveform of a remaining inverter to be a steep gradient when failure occurs in the set of n inverters.

10. An electric power steering system comprising:
a set of n coils driven by a set of n inverters, n being defined as an integer of 2 or more;
a steering wheel;
a rotation shaft attached to the steering wheel;
a torque sensor attached to the rotation shaft;
a steering mechanism;
a motor; and
two redundant control devices, each of the redundant control devices being configured to individually control the motor, such that upon failure of one of the two redundant control devices, the other of the two redundant control devices is configured to continue controlling the motor, wherein
the steering mechanism is steered by the rotation shaft,
the steering mechanism or the rotation shaft has steering force assisted by the motor,
the motor control device controls the motor,
at least one inverter in the set of n inverters has an output duty cycle of 100% when output of the set of n inverters is higher than a given value, the at least one inverter switching another inverter of the set of n inverters with a predetermined frequency,
the motor device is configured to operate at a given cycle, the given cycle being 1/(the predetermined frequency), the given cycle is less than a thermal time constant of each of the at least one inverter and the another inverter.

11. The electronic power steering system according to claim 10, further comprising three phase to two phase converters, each three phase to two phase converter being directly interposed between the motor and one of the set of n inverters.

* * * * *